Jan. 23, 1968  A. T. KORNYLAK  3,365,052

MATERIAL HANDLING MEANS

Filed Sept. 26, 1966  4 Sheets-Sheet 1

INVENTOR
ANDREW T. KORNYLAK
Chandler Pidgeon
AGENT

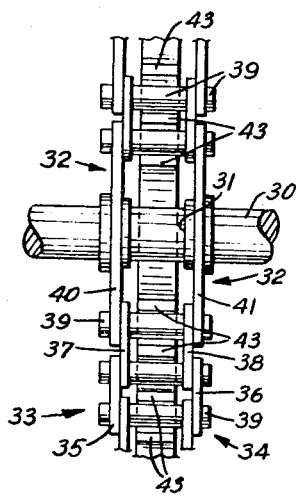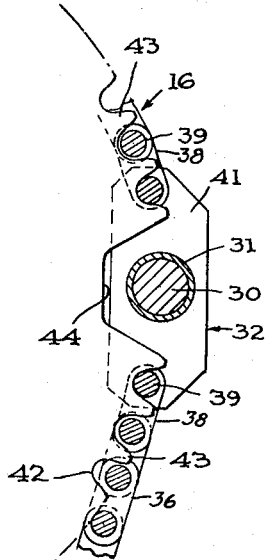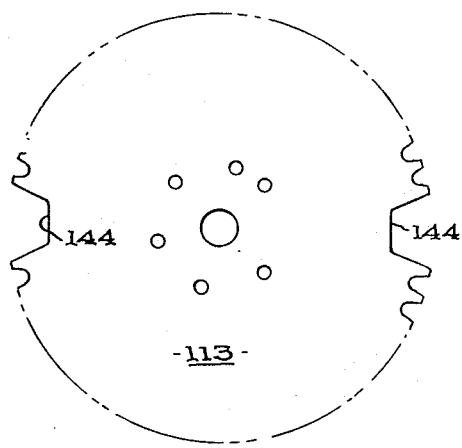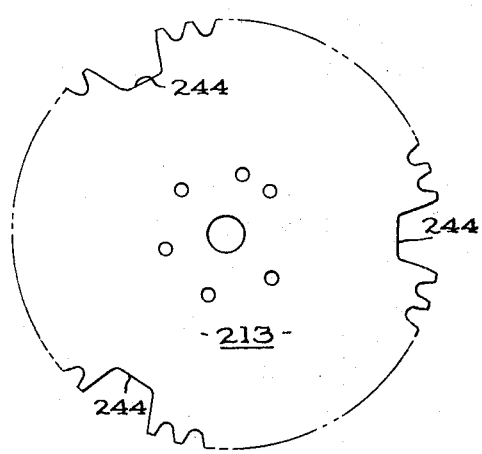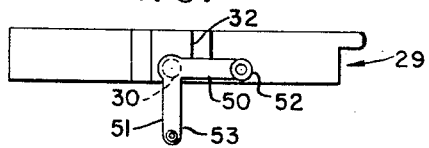

Jan. 23, 1968     A. T. KORNYLAK     3,365,052
MATERIAL HANDLING MEANS
Filed Sept. 26, 1966     4 Sheets-Sheet 3

INVENTOR
ANDREW T. KORNYLAK

BY *C Chandlee Pidgeon*

AGENT

Jan. 23, 1968  A. T. KORNYLAK  3,365,052

MATERIAL HANDLING MEANS

Filed Sept. 26, 1966  4 Sheets-Sheet 4

INVENTOR
ANDREW T. KORNYLAK
BY Chandlee Pidgeon
AGENT ively that many modifications will suggest themselves to 3,365,052

MATERIAL HANDLING MEANS

Andrew T. Kornylak, 400 Heaton St.,
Hamilton, Ohio 45011

Continuation-in-part of application Ser. No. 499,584,
Oct. 21, 1965. This application Sept. 26, 1966, Ser.
No. 581,883

14 Claims. (Cl. 198—158)

ABSTRACT OF THE DISCLOSURE

The disclosure relates to a material handling means for use in buildings, warehouses, ships and other suitable locations. It comprises a unitary elongated casing or housing having a vertical conveyor mounted therein which includes sprockets mounted in pairs on two opposite walls of the casing, and sprocket chains carried by said sprockets. Shelves or trays are mounted on said chains for vertical travel, with provision for holding the shelves horizontal during one direction of vertical travel, and substantially vertically during travel in the reverse direction, making for economy in space. The structure comprehends a rigid unitary self-supporting conveyor that may be mounted as a complete unit in a hatchway or shaft. Such units up to 80 feet in length are handled. Shelf supporting stub shafts are mounted on the shelves. Endless tracks mounted on the walls of the casing cooperate with bell-crank levers on the stub shafts on the shelves to control the position of the shelves during their travel in an endless path. Each sprocket chain contains spaced shaft or shelf carrying links, each having a bushing therein to accommodate a stub shaft. The shelf or shaft carrying links comprise oversize plates, having the bushings intermediate their ends and having sprocket pins adjacent their ends. The centers of the bushings are substantially in line with the centers of the sprocket pins, so that the load on the chains is always in line with the sprocket pins. The sprockets have deepened tooth spaces regularly spaced thereabout to accommodate the bushings. Suitable spaced door openings are provided in one side of the casing for loading or unloading shelves at various vertically spaced locations, preferably at each loading and/or unloading level. An opening may be provided adjacent the top of the casing in the opposite wall for loading and unloading. Suitable fire doors are located adjacent said openings. A fire resistant coating may be applied to the exterior of the casing.

---

This application is a continuation-in-part of my abandoned application Ser. No. 499,584, filed Oct. 21, 1965.

This invention relates to an improvement in a material handling means, and more particularly to a vertical conveyor having a plurality of normally horizontal, spaced apart, vertically movable shelves or carriers. In the device of this invention, the shelves in a horizontal position move vertically to convey articles from one level to another, and at the end of such movement they turn their outer ends upwardly for travel vertically through a more restricted space.

In former conveyors of this general type, the shelf or load carrier has been mounted on some sort of bracket attached to the sprocket chain. Such mounting tends to twist or cant the chain away from a normally vertical path. Further, when the bracket is in a position substantially horizontally radially of a sprocket axis, the lever arm at the sprocket lengthens. At other times when the chain, only, embraces the lever arm is normal, and the lengthening above noted is the cause of the canting of the chain and makes the load on the driving motor variable.

With this invention shaft supporting bushings are mounted in longitudinally spaced apart, somewhat oversize, links having normal sprocket pins at their ends and intermediate shaft carrying bushings. The sprockets have deepened tooth recesses or pin pockets spaced about their peripheries, whereby to provide selectively variable shelf spacing. The depth of these deeper pockets brings the axes of the bushings substantially in line with the pitch circle, as with the normal sprocket pins, and, therefore, the axes of the shafts are substantially on the pitch circles of the sprockets. There is no change in the radial lever arm as a bushing and shaft come horizontally radially opposite the axes of the sprockets. The driving effect is smooth and the lift is always along the center of the chain.

This invention is an improvement over the elevator means disclosed in my application Ser. No. 398,146, filed Sept. 8, 1964.

A particular use of the vertical conveyor of this invention is to convey articles from the deck of a ship to the hold or vice versa. For this purpose, the vertical conveyor would be mounted in a hatch or other shaft or passageway of a ship. Use is, however, not restricted to marine structures, but is capable of use in any building structure.

One of the objects of this invention is the provision of a plurality of vertically traveling endless chain means carrying a plurality of shelves and for moving said shelves in a closed path.

Another object of this invention is the provision of means for moving spaced apart shelves mainly in a vertical direction in a closed path and for varying the spacing of the shelves.

A further object of this invention is the provision of an endless carrier means having means moving vertically in a closed path and carrying shelves traveling normally in a substantially horizontal position on one flight of the carrier means and being turned to a position substantially normal to that in the first path on the return flight to travel in a more restricted space.

Still another object of this invention is the provision of a pair of substantially parallel spaced apart sprocket chains having links comprised of parallel spaced plates connected by sprocket chain pivot pins engageable with sprocket teeth for driving the chains said spaced apart plates having tubular bearings therein for supporting shelf bearing shafts, and including sprockets for such chains having spaced tooth recesses or link pin pockets of greater depth than the normal link pivot recesses, to accommodate the bearing bushings.

A still further object of this invention is the provision of a vertical conveyor wherein the sprockets are interchangeable in order to provide for various spacings of the shaft bearing bushings.

An additional object of this invention is the provision of a sprocket having alternate deep and shallow tooth recesses, whereby the spacing of shelves may be any multiple of two teeth and sprocket links.

Another object of this invention is the provision of a unitary trunk having the complete vertical conveyor assembled therewithin, and guiding means on its interior wall for controlling the motion of the shelves.

Another particular feature of this invention is the provision of shelf bearing shafts affixed to the shelves and passing through bushings in certain sprocket links and having bell-crank levers at their outer ends cooperating with guiding means mounted on the trunk wall to control the positions of the shelves during their circulatory movement.

Another particular object of this invention is the provision of guiding means permitting loading or unloading at the front of the elevator, on either up or down movement, and means adjacent the top for loading or unloading at the rear of the elevator, on either up or down motion.

These and other objects will be apparent from a consideration of the following specification taken with the accompanying drawings, forming a part thereof, and which taken together comprise a complete disclosure of my invention.

In the drawings, wherein like parts are denoted by like characters of reference throughout the several figures:

FIG. 3 is a fragmentary view of a shelf frame and the control arm;

FIG. 4 is a diagrammatic elevation showing partially in section, showing a form of sprocket and chain;

FIG. 4A is a fragmentary edge view of the structure as shown in FIG. 4;

FIGS. 5 and 6 are modifications of the sprocket shown in FIG. 4, indicating various spacings;

Figure 1:
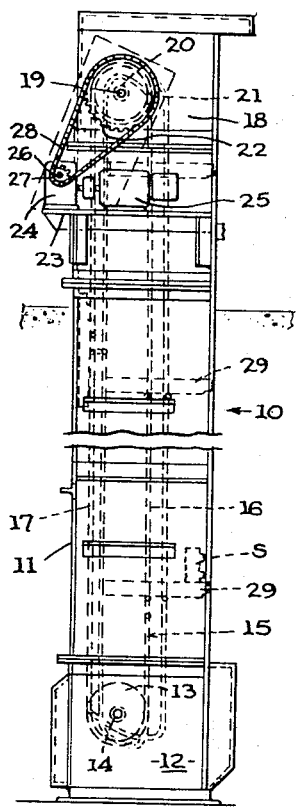
FIG. 1 is a generally diagrammatic side view of the vertical conveyor similar to FIG. 6 of my prior application above noted.

The vertical conveyor 10 as shown in FIG. 1 comprises a frame 11 in the form of a generally rectangular tube open on at least part of the front. This tube may be a hatchway or elevator shaft in a ship or other structure. At the base of the tube 11 there is a housing 12 in which the lower sprockets are located, only one, 13, being shown, mounted on a shaft 14. The sprocket chain 15 passes about the sprocket 13 and has front reach or flight 16 and rear reach or flight 17. At the upper end of the frame 11 there is a housing 18 in which there is a shaft 19 mounted in bearings 20, only one of which is shown. The shaft 19 carries sprockets 21, only one being shown. Outside the housing 18 on the shaft 19 there is a sprocket 22. On a shelf 23 at the rear of the tube 11 there is a reduction gear 24 driven by the motor 25, mounted on said shelf. The output shaft 26 of the reduction gear 24 supports a sprocket 27 which is connected to the sprocket 22 by means of the sprocket chain 28.

Each shelf 29 is supported on a stub shaft 30 which is rotatably mounted in a bushing 31 in the sprocket chain 15 as seen in FIGS. 4 and 4A. The sprocket chain 15 consists of links 33 and 34 having side bars respectively 35, 36 and 37, 38 connected by pins 39. The link 32 has side bars 40, 41 connected to sprocket link pins 39, spaced four links apart. The pins 39 enter tooth recesses 42 so that the teeth 43 drive the chain 15. The tooth recesses 44 are made deeper than the tooth recesses 42 to accommodate the bushings 31. Each side bar 40, 41 carries a bushing 31 for supporting the shaft 30.

To control shelves 29, maintaining them horizontal on one flight, and inclined on the return flight, I provide tracks 45, 46, 47 and 48 on two of the inner walls of the tube 11. The tracks 45 and 48 are preferably spaced farther from the wall than are the tracks 46 and 47 to accommodate crossover loops, not shown, at the upper and/or lower ends of the elevator whereby to control the angle of the shelves 29. In FIG. 3, the shelf 29 is shown having its stub shaft 30 fixed thereto. On this shaft, outboard the bushing 31, there is fixed a bell-crank lever 49 having arms 50, 51. The arm 50 has a roller 52 which rides in track 45, and the arm 51 has a roller 53 which rides in the track 46, to maintain the shelf 29 substantially horizontal during vertical travel on the front flight 16 of the chains 15. At this time the arm 50 is substantially horizontal and the arm 51 is substantially vertical. On the return flight 17 the position of the arms 50, 51 is changed approximately 90°, so that the arm 51 is substantially horizontal having its roller 53 riding in the track 47, and the roller 52 on the arm 50 rides in the track 48. Thus on the return flight the shelf 29 assumes a position nearly vertical or at a very acute angle to the vertical.

As shown in FIG. 4, the sprocket 13 has one enlarged recess 44, so that it accommodates shelf shafts spaced apart a distance equal to the circumference of the sprocket 13, and the centers of the shelf stub shafts 30 are on the same line as the centers of the sprocket link pivots 39.

In FIG. 5, a modification is shown wherein the sprocket 113 has two enlarged recesses 144 permitting shelf stub shafts to be spaced a distance equal to half the circumference of the sprocket 113 or any multiple of ½ circumference.

In FIG. 6, I show a further modification wherein the sprocket 213 has three enlarged recesses 244 to permit spacing of the stub shafts ⅓ the circumference of the sprocket 213 or any suitable multiple of ⅓ the circumference.

Figure 7:
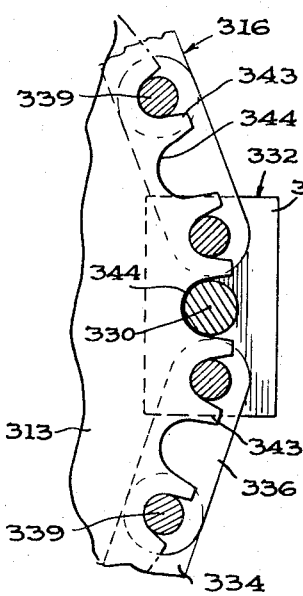
FIG. 7 is a fragmentary elevation of a further modified sprocket with a portion of a sprocket chain.
Figure 8:
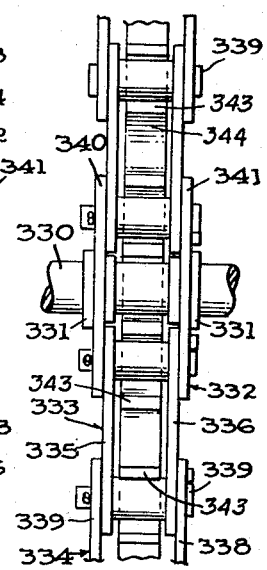
FIG. 8 is an edge view of the sprocket and chain of FIG. 7.
Figure 2:
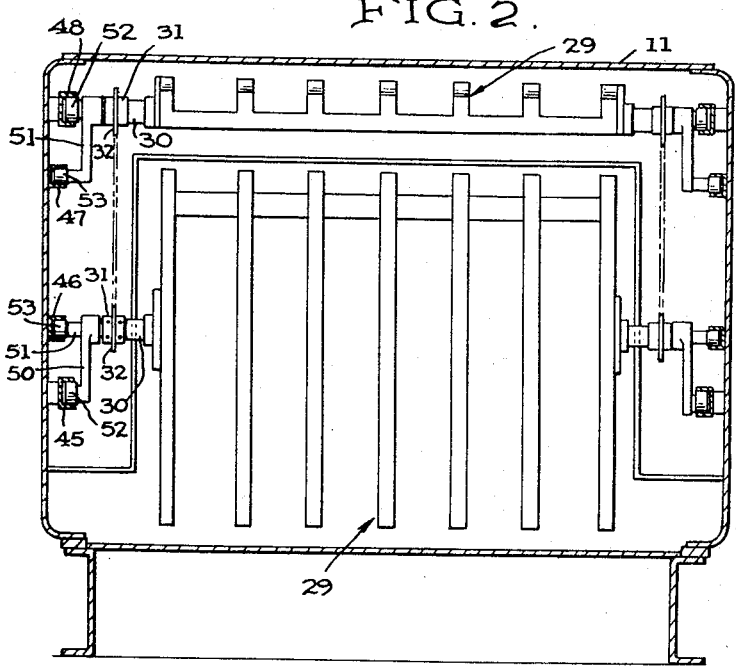
FIG. 2 is a transverse section showing the shelves in two positions, and the control for same.

In FIGS. 7 and 8 there is shown a further modification of the sprocket and chain wherein on the sprocket 313 alternate tooth recesses or pivot pin pockets are deepened to accommodate bushings 331 and the stub shafts 330. The sprocket teeth 343 engage the sprocket pins 339 and stub shafts 330. The bushings 331 are formed on links 332 comprised of plates 340, 341 having openings near their ends to accommodate sprocket pins 339. Sprocket links 333 and 334 are like links 33 and 34, and have side bars respectively 335, 336 and 337, 338. It is, of course, necessary and as shown in FIG. 8, that the sprocket teeth clear the bushings 331 as well as the plates 335 and 336. The alternate deepened tooth recesses 344 correspond generally to the recesses 44, 144 and 244, heretofore described. In this construction, the stub shafts 330 may be spaced along the chains 15 any suitable multiple of two links, thus permitting greater choice of shelf spacing than by the other sprocket conformations described.

In operation, a suitable sprocket 13, 113, 213 or 313 is placed on the shaft 14, and a similar sprocket is placed on the shaft 19 in lieu of the sprocket 21. The shelf stub shafts 30, 130, 230 or 330 are inserted on the chains 15 in the corresponding bushings 31, 131, 231 and 331 and the chains are trained over the sprockets as described above. The bell-crank levers 49 are set so that the shelves 29 are horizontal on the front flight 16, and will assume a position to bring the shelves substantially vertical on the return flight 17.

It is contemplated that instead of using an existing tubular casing 11, I may, in come cases, mount the tracks 45, 46, 47 and 48 or their equivalents in a self-contained trunk which may be installed in the hatchway, vertical passageway or shaft of the ship or other structure. Such trunk may be open at suitable points adjacent its upper and lower ends and at desired intermediate levels to accommodate loading and unloading means. Such an integrated or unitary trunk and its accessories is disclosed in FIGS. 9 to 12, inclusive.

Figure 9:
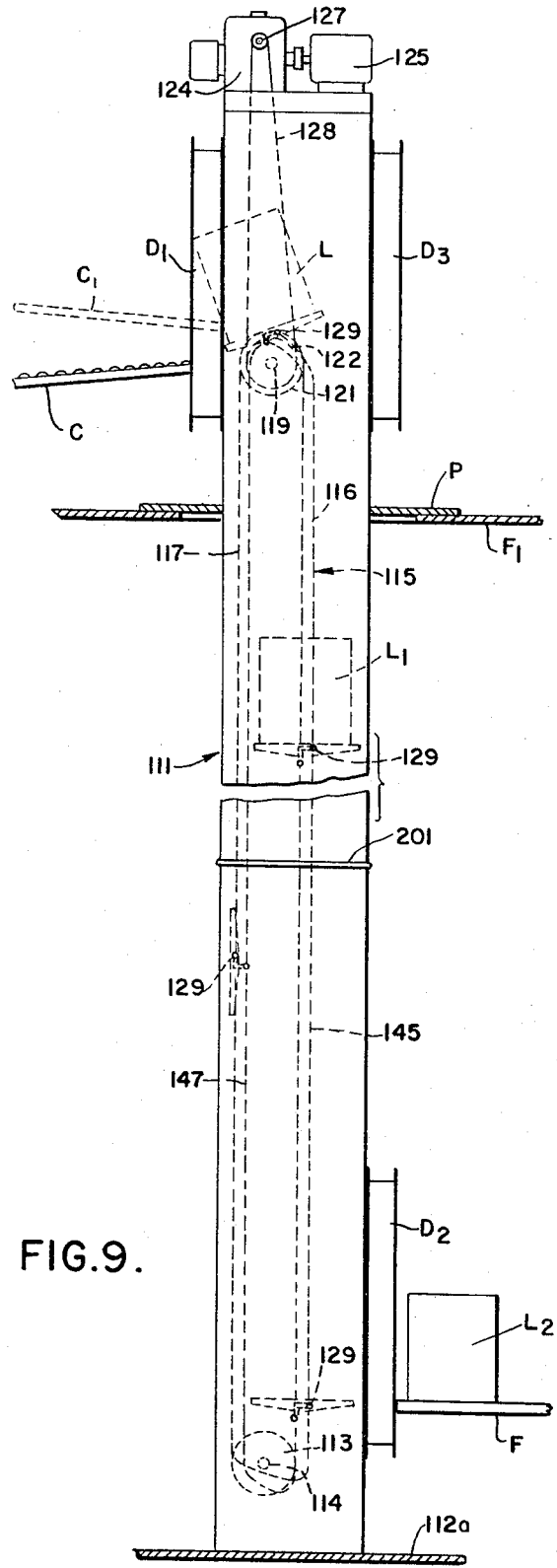
FIG. 9 is a somewhat diagrammatic view similar to FIG. 1, showing the tubular housing of the unitary trunk of this invention.

A tubular casing 111, preferably rectangular in cross section is shown in FIG. 9 as resting on a floor or other support 112A. Adjacent the lower end of the trunk there is a sprocket 113 mounted on a stub shaft 114 attached to the wall of the trunk. Adjacent the upper end of the trunk 111, there is a shaft 119 mounted in suitable bearings carrying a sprocket 121. At the top of the casing or trunk 111, there is a reduction gear 124 driven by a motor 125. The output of the reduction gear 124 includes a sprocket 127 which drives a sprocket 122 on the shaft 119 to rotate the shaft 119 and the sprocket 121.

It is to be understood that at the far end of the shaft 119 as seen in FIG. 9, there is another sprocket 121 carrying another chain 115 not shown here. Also, opposite the sprocket 113, there is another sprocket 113, not shown in FIG. 9, these other sprockets carrying the other chain 115.

Figure 10:
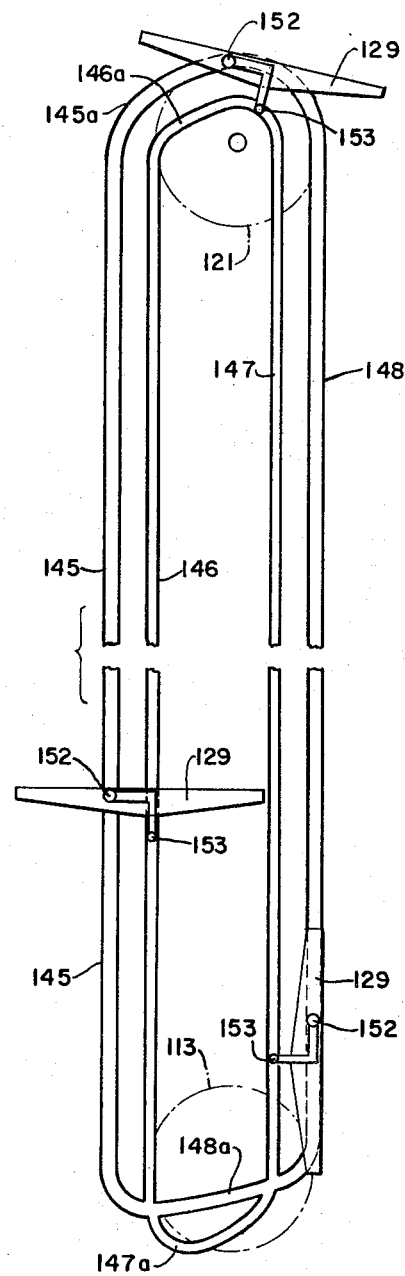
FIG. 10 is a layout of one form of track used for guiding and controlling the shelves in their movement.

For controlling the inclination of the shelves 129, the tracks 145, 146 and 147, 148 are provided. Each pair of tracks 145, 146 and 147, 148 is a substantially closed circuit, having their main portions parallel to the parallel runs or flights 116 and 117 of the chains 115. The tracks 146 and 147 are connected by a loop 146a at one end and by loops 147a at the other end. The tracks 145 and 148 are connected by a loop 145a at one end and by a loop 148a at the other end. The loops 145a and 148a cross one another at two places. This causes the rollers 152 and 153 to turn about the axis of the shaft 131 to change position the shelf 129 from a vertical position as seen at the lower right in FIG. 10 to a horizontal position as seen at the left in FIG. 10. The tracks 146 and 148 are substantially centered with the runs 116 and 117, respectively, of the chains 115. In FIGS. 9 and 10, a carrier or shelf 129 is shown at the loops 145a and 146a adjacent a loading and unloading conveyor C, shown in dotted line position for loading the shelf 129 and in full line position for receiving a load L from the shelf 129. Thus, this position can operate on either up or down motion of the shelf for loading and/or unloading. Passage of the load into or out of the elevator may be through an opening closed by a door D1. About midway of FIG. 9, a shelf 129 is shown carrying a load L, which may have been received at the door D2, as shown at the lower right in FIG. 9, where a load L2 is resting on a deck, floor or other support F in position to be placed on a shelf 129. In order to provide a tight fit, whenever the trunk 111 is smaller than the hatchway or shaft in which it is being installed, plates P may be welded to the deck or floor F, and to the tube 111. Loading and unloading usually takes place at the door D2 or D3, or any intermediate door. Any well known electrical controls may be used for the control of the vertical conveyor, such as up, down, run-stop switches, in a control unit such as the unit S in FIG. 1. Other suitable control units are shown at 188 in my copending application Ser. No. 398,146, mentioned above.

The doors D1, D2, D3 may be any suitable closures, and will preferably be of a conventional fire door type.

Figures 11, 12, 13:
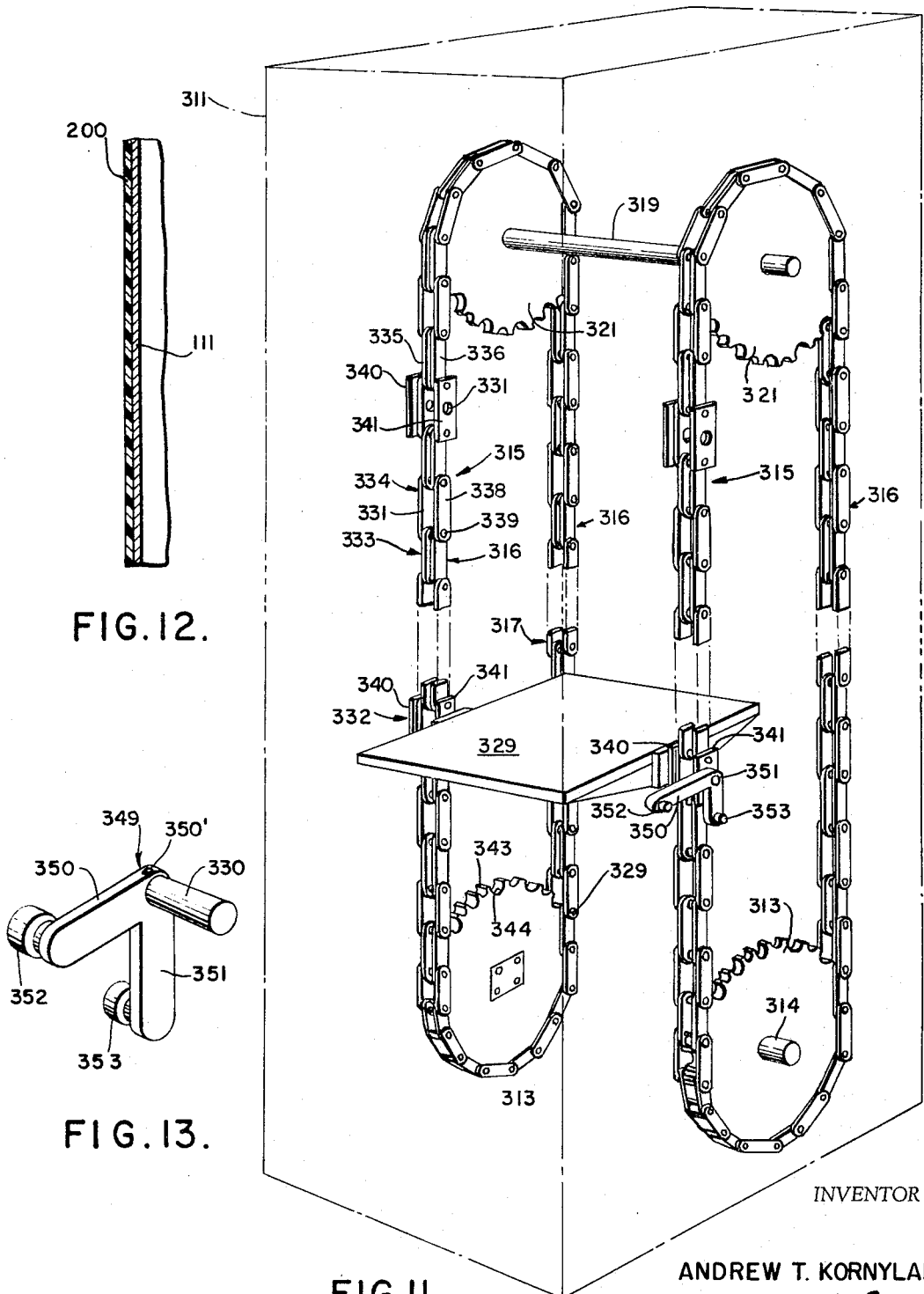
FIG. 11 is an axonometric view showing the chains and sprockets of FIGS. 7 and 8, within the trunk, the latter being shown in dashed lines.
FIG. 12 is a fragmentary view showing the application of a fireproofing material to the exterior of the trunk.
FIG. 13 is an axonometric view of a bell crank, such as the one at the left end of the shelf 329 and not shown in FIG. 12.

In FIG. 11, I show the tube 311, corresponding to the tube 111, having chains and sprockets thereon of the type shown in FIGS. 7 and 8. Here, the chains 315 have front reaches or flights 316, and rear reaches or flights 317. These chains are trained about sprockets 313, on stub shafts 314 and sprockets 321 on shaft 319. The sprockets have alternate tooth recesses 344 deepened, as in FIG. 7. With this arrangement, the shelves or carriers such as 329 may be spaced any multiple of two sprocket chain links.

The shelf and its controlling means include a suitable number of links 332 spaced at intervals along the chains 315. Each shelf 329 carries a bell-crank lever 349 mounted on the stub shaft 330 by suitable means such as a set screw or bolt 350'. The bell-crank lever 349 has arms 350 and 351, the former extending generally parallel to the shelf 329, and the latter projecting downwardly, as seen in FIGS. 11 and 13, from the shelf 329. The rollers 352 and 353, respectively, ride in suitable channel tracks on the inner walls of the tube 311, such as the tracks 145, 146, 147 and 148 above described.

It is to be particularly noted that the enlarged tooth recesses or sprocket pin pockets 44, 144, 244 and 344 are so arranged that the axes of any bushings 31, 131, 231, or 331 are substantially on the pitch circle of the respective sprockets, and are in a line with axes of the sprocket pins 39, 139, 239 and 339. In other words, the bushings are so arranged that the axis of a stub shaft 30, 130, 230 or 330, during movement about the axis of a sprocket, is substantially on the pitch circle of the sprocket whereby the force exerted at the radius of the pitch circle on all pins and stub shafts is the same. There is no change of lever arm such as would occur if the shelf supports were outside the confines of the sprocket chain. There is, therefore, a constant lift on a shelf whether in the vicinity of a sprocket or elsewhere in its path of travel.

In order to protect the tube 111 or 311 and the mechanism therein in case of fire, I spray or trowel on a coating of suitable plastic material which expands when subjected to heat, and is fireproof. In FIG. 12, I show a layer of plastic material 200 on tube 111. The same would apply to any other tube such as 311. The material 200 may be factory applied or applied during installation. At present I prefer to use a commercially available material known as ALBI-CLAD spray on fireproofing. This layer may be ⅜″ or more in thickness.

The units 111 and 311 are now preferably made in sections of standard lengths, such as 10 or 20 feet, and will be connected by welding or otherwise joining as at 201 in FIG. 9. However, they can now be handled as units up to 80 feet in length.

Having now described my invention in a preferred form, I desire it to be known that modifications and changes may be made within the skill of the art and the scope of the appended claims.

I claim:

1. A material handling means comprising a unitary casing, a load carrying shelf, vertically spaced sprockets mounted adjacent opposite walls, sprocket chains on said sprockets, said sprocket chains including shelf supporting links for supporting said shelf on said shelf supporting links, said shelf being rotatably mounted on said sprocket chains, means integrally formed on said casing walls controlling said shelf for travel in a substantially horizontal position during a first portion of its path of travel and means turning said shelf for travel in a substantially vertical position during a second portion of its path of travel said shelf supporting links each including a bushing, a stub shaft on each end of each shelf rotatably mounted in each said bushing.

2. The structure as defined in claim 1 including spaced apart openings in one side of said casing adjacent at least two levels, and means for loading and/or unloading a shelf at each opening.

3. The structure as defined in claim 1 wherein the means for holding the shelves in substantially horizontal position and then in a substantially vertical position comprises substantially parallel pairs of tracks substantially parallel to the chains along the reaches of upward and downward movement of the chains, said tracks intersecting adjacent at least one end of the path of travel of the shelf, and including a bell-crank lever on each stub shaft, one arm of said lever having means riding in one of said tracks and the other arm, substantially normal to the first, having means riding in the other track.

4. The structure as defined in claim 1 wherein the shaft carrying links are substituted for at least two normal sprocket chain links.

5. The structure as defined in claim 1 wherein each bushing carrying link is substituted for four normal sprocket chain links.

6. The structure as defined in claim 1 wherein each shaft carrying link comprises a pair of spaced side plates, sprocket engaging pins connecting the side plates adjacent each end thereof, each side plate having its shaft carrying bushing mounted intermediate its ends.

7. The structure as defined in claim 1 wherein each sprocket has at least one deepened and enlarged sprocket link pin pocket of sufficient depth to center the axes of the bushings substantially on the pitch circle of the sprocket.

8. The structure as defined in claim 7 wherein a sprocket is provided with a plurality of deepened and enlarged sprocket link pin pockets equally spaced about its periphery.

9. The structure as defined in claim 8 wherein the deepened and enlarged sprocket link pin pockets are separated by two sprocket teeth, whereby the spacing of shelves on a chain may be any multiple of two sprocket chain links.

10. The structure as defined in claim 2 wherein the housing is rectangular, and including means adjacent said openings for loading and unloading said shelves.

11. The structure as defined in claim 10 including an opening on the opposite side adjacent the upper end of the housing for loading and unloading.

12. The structure as defined in claim 11 including automatic fire doors at said openings, and a fireproofing material applied on the outside of said housing.

13. The structure as defined in claim 12 wherein said fireproofing material is a non-combustible material which expands into a cellular structure under the influence of heat.

14. A unitary loading and unloading conveyor device adapted to be installed in a vertical shaft in a structure, comprising an elongated housing, spaced apart substantially parallel endless sprocket chains in said housing, upper and lower sprockets supporting said chains, with substantially vertical runs of said chains between said sprockets, said chains having sprocket chain links and pins, spaced apart shaft carrying links thereon having shaft carrying bushings therein, the axes of said bushings being in line with the sprocket pins, and having spaced apart shelves mounted thereon and extending therebetween, and adapted for circulatory movement therewith, means holding said shelves substantially normal to the substantially vertical run of said chains during motion in one direction and holding said shelves substantially parallel to the substantially vertical run of said chains during motion in the other direction, said sprockets having deepened pin pockets to receive said shaft carrying bushings, bell-crank levers on said shelves, guide means on the inside of said casing for controlling the position of said shelves, cooperating with said bell-crank levers.

References Cited

UNITED STATES PATENTS

| | | | |
|---|---|---|---|
| D. 29,142 | 8/1898 | Dunn | 74—243 X |
| 2,081,301 | 5/1937 | Hudspeth | 198—155 |
| 2,747,724 | 5/1956 | Kornylak | 198—155 |
| 2,960,209 | 11/1960 | Everhart | 198—140 |
| 3,279,928 | 10/1966 | Lawrence | 106—15 |

EDWARD A. SROKA, *Primary Examiner.*